(12) United States Patent
Palmer et al.

(10) Patent No.: US 10,065,738 B2
(45) Date of Patent: Sep. 4, 2018

(54) TETHERED UNMANNED AERIAL VEHICLE

(71) Applicant: HARRIS CORPORATION, Melbourne, FL (US)

(72) Inventors: William R. Palmer, Melbourne, FL (US); Daniel L. Schlig, Melbourne, FL (US); Timothy F. McLellan, Viera, FL (US)

(73) Assignee: Harris Corporation, Melbourne, FL (US)

( * ) Notice: Subject to any disclaimer, the term of this patent is extended or adjusted under 35 U.S.C. 154(b) by 187 days.

(21) Appl. No.: 15/243,324

(22) Filed: Aug. 22, 2016

(65) Prior Publication Data

US 2018/0050797 A1 Feb. 22, 2018

(51) Int. Cl.
| | |
|---|---|
| *B64C 37/02* | (2006.01) |
| *B64C 39/02* | (2006.01) |
| *F03D 9/32* | (2016.01) |

(Continued)

(52) U.S. Cl.
CPC .............. *B64C 39/022* (2013.01); *B64B 1/06* (2013.01); *B64B 1/12* (2013.01); *B64B 1/20* (2013.01); *B64B 1/50* (2013.01); *B64B 1/58* (2013.01); *B64B 1/62* (2013.01); *B64C 39/024* (2013.01); *F03B 17/06* (2013.01); *F03D 1/04* (2013.01); *F03D 9/002* (2013.01); *F03D 9/32* (2016.05); *F03D 13/20* (2016.05); *B63B 2035/006* (2013.01); *B63G 2008/002* (2013.01); *B64C 2009/005* (2013.01); *B64C 2201/148* (2013.01); *F03D 5/00* (2013.01); *F05B 2220/706* (2013.01);

(Continued)

(58) Field of Classification Search
CPC ......... B64C 31/06; B64C 39/022; F03D 3/00; F03D 3/005; F03D 5/00
See application file for complete search history.

(56) References Cited

U.S. PATENT DOCUMENTS

| 9,694,894 B2 * | 7/2017 | Deakin ..................... B64B 1/38 |
| 2010/0013226 A1 * | 1/2010 | Blumer ..................... B64B 1/50 |
| | | 290/44 |

(Continued)

FOREIGN PATENT DOCUMENTS

| GB | 2212563 A | 7/1989 | |
| WO | 2007051034 A2 | 5/2007 | |
| WO | 2010006433 A1 | 1/2010 | |
| WO | WO 2010006433 A1 * | 1/2010 | ............... B64B 1/10 |

*Primary Examiner* — Timothy D Collins
*Assistant Examiner* — Tye William Abell
(74) *Attorney, Agent, or Firm* — Fox Rothschild LLP; Robert J. Sacco; Carol E. Thorstad-Forsyth

(57) ABSTRACT

Tethered unmanned aerial vehicle (TUAV) includes at least one wing fixed to a fuselage. The wing is comprised of an airfoil shaped body capable of producing lift in response to a flow of air across a major wing surface, and can include at least one flight control surface, such as an aileron. One or more buoyancy cell is disposed within the fuselage for containing a lighter than air gas to provide positive buoyancy for the TUAV when the TUAV is disposed in air. A tether attachment structure facilitates attachment of the TUAV to a tether which is secured to an attachment point for securing the TUAV to the ground when aloft. A wind-powered generator is integrated with the TUAV and configured to generate electric power in response to the flow of air across the least one wing when the TUAV is aloft.

23 Claims, 9 Drawing Sheets

(51) Int. Cl.
   *B64B 1/12*      (2006.01)
   *B64B 1/20*      (2006.01)
   *F03D 1/04*      (2006.01)
   *F03D 9/00*      (2016.01)
   *B64B 1/06*      (2006.01)
   *B64B 1/50*      (2006.01)
   *B64B 1/58*      (2006.01)
   *B64B 1/62*      (2006.01)
   *F03B 17/06*     (2006.01)
   *F03D 13/20*     (2016.01)
   *B63B 35/00*     (2006.01)
   *B63G 8/00*      (2006.01)
   *B64C 9/00*      (2006.01)
   *F03D 5/00*      (2006.01)

(52) U.S. Cl.
   CPC ..... *F05B 2240/123* (2013.01); *F05B 2240/21* (2013.01); *F05B 2240/921* (2013.01); *F05B 2240/922* (2013.01); *F05B 2270/18* (2013.01)

(56) References Cited

U.S. PATENT DOCUMENTS

| | | | |
|---|---|---|---|
| 2011/0192938 A1* | 8/2011 | DiMarzio | B64B 1/50 244/53 R |
| 2011/0267241 A1* | 11/2011 | Grimm | B64B 1/02 343/706 |
| 2016/0053742 A1* | 2/2016 | Harwood | F03D 3/0454 415/121.3 |
| 2016/0207626 A1 | 7/2016 | Bailey | |
| 2017/0248125 A1* | 8/2017 | Luchsinger | F03D 9/32 |

* cited by examiner

TETHERED UNMANNED AERIAL VEHICLE

BACKGROUND OF THE INVENTION

Statement of the Technical Field

The inventive arrangements relate to unmanned aerial vehicles (UAVs) and more particularly to UAVs that are capable of providing low cost, long duration flight time to support command, control communication and surveillance activities.

Description of the Related Art

Unmanned aerial vehicles are commonly used to facilitate various command, control, communications, computers, intelligence, surveillance and reconnaissance (C4ISR) functions. Exemplary UAV systems used for such purposes can include fixed wing aircraft, rotary wing aircraft, conventional blimps and balloons. But all of the foregoing platforms have various weaknesses as applied to the C4ISR function.

The payload capacity of many UAVs can be quite limited and the mission cost of operating a UAV can be significant. Significant resources with regard to personnel, facilities and equipment are often needed to support the operations of such systems. For example, conventional fixed wing and/or rotary wing UAV systems need substantial human involvement in their day to day launching, operation, recovery and maintenance. Also, conventional fixed and/or rotary wing UAVs have limited duration flight times such that their ability to dwell over a particular area of the earth is also necessarily limited. As such, the overall expense of operating a fixed or rotary wing UAV can be quite significant.

Blimps, aerostats and tethered airships have also been used for purposes of supporting various C4ISR functions. These systems can be cost effective platforms for C4ISR purposes, but blimps must have a suitable power source to operate propulsion systems and onboard equipment. Onboard diesel generator sets are typically provided for this purpose but fuel requirements can be a significant factor resulting in limited flight duration. Tethered airships can be more cost effective but still frequently have limited flight duration due to the need for fuel to power onboard diesel generator sets. A further problem with conventional tethered airships arises in the event that the tether is broken. Lacking suitable flight control capabilities, the tethered airship that breaks loose from its moorings can be difficult to recover. Moreover, significant resources may be required with regard to personnel, facilities and equipment needed to support the operations of such blimps and aerostats.

Alternatives to UAVs include earth orbiting satellites and fixed towers. But earth orbiting satellites are even more expensive to launch and operate as compared to UAVs. Fixed towers also have obvious limitations with regard to their deployment in hostile environments and remote geographic locations. Such towers also lack mobility and may be insufficient with regard to their overall height above ground to fully support many applications.

SUMMARY OF THE INVENTION

A tethered unmanned aerial vehicle (TUAV) is disclosed. The TUAV is comprised of a fuselage defining a central body of the TUAV and at least one wing fixed to the fuselage. The wing is comprised of an airfoil shaped body capable of producing lift in response to a flow of air across a major wing surface. The TUAV has at least one aileron, which is configured to selectively vary roll, and thus attitude of the TUAV in flight in response to a control signal. The TUAV can also have a trailing control surface to facilitate rotations of the vehicle about a vertical axis. At least one buoyancy cell is disposed within the fuselage and configured for containing a lighter than air gas. The one or more buoyancy cells can contain a predetermined volume of lighter than air gas sufficient to provide positive buoyancy for the TUAV when the TUAV is disposed in air. According to one aspect, the buoyance and buoyance distribution within the TUAV can be varied as needed in flight. According to a further aspect, the lighter-than air gas that is used to facilitate buoyancy is replenished in flight from the environment to replace gas that is lost over time on a long duration mission. A tether attachment structure secured to the fuselage facilitates attachment of the TUAV to a tether. The tether is secured to a tether attachment point for securing the TUAV to the ground when aloft. At least one wind-powered generator is integrated with the TUAV and configured to generate electric power in response to the flow of air across the least one wing when the TUAV is aloft.

According to a further aspect, there is disclosed herein a method for providing an airborne platform which is easily deployed and capable of very long duration flights without human intervention. The method involves maintaining a (TUAV) aloft using at least one buoyancy cell disposed within a fuselage of the TUAV to contain a predetermined volume of lighter-than-air gas sufficient to provide a positive buoyancy for the TUAV when the TUAV is disposed in air. The method further involves providing at least one wing fixed to the fuselage to exert a lifting force on the TUAV while aloft in response to a flow of air across the at least one wing caused by the presence of wind. Thereafter, the TUAV is maintained within a limited range of geographic positions over a ground surface by securing the TUAV to the ground using a tether. The method further involves controlling a geographic position of the TUAV within the limited range of geographic positions while in the presence of wind by selectively varying a position of at least one flight control surface of the TUAV in response to a control signal. This control process can be responsive to human user inputs received at the TUAV and/or from sensor inputs (e.g. sensors disposed in/on the TUAV). Electrical power onboard the TUAV is generated in response to the flow of air across the at least one wing, thereby enabling potentially long duration electrical power for control and payload operability.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

A tethered unmanned aerial vehicle (TUAV) is disclosed herein that is buoyant, but includes rigid or substantially rigid wings capable of generating lift. The wings advantageously include one or more control surfaces (e.g. ailerons) so as to allow a flight of the TUAV to be controlled in a manner similar to a conventional fixed wing aircraft. To this end, the TUAV will have an onboard control system which can operate autonomously and/or under the wired or wireless command of a remote control station. The TUAV will also have a wind-based power generation capability that allows the TUAV to generate electric power for potentially indefinite time periods without the need for an onboard fuel reservoir. Further, a lifting gas replenishment system (LGRS) is provided in the TUAV to facilitate generation of at least one gas that is needed to maintain buoyancy.

Figure 1:
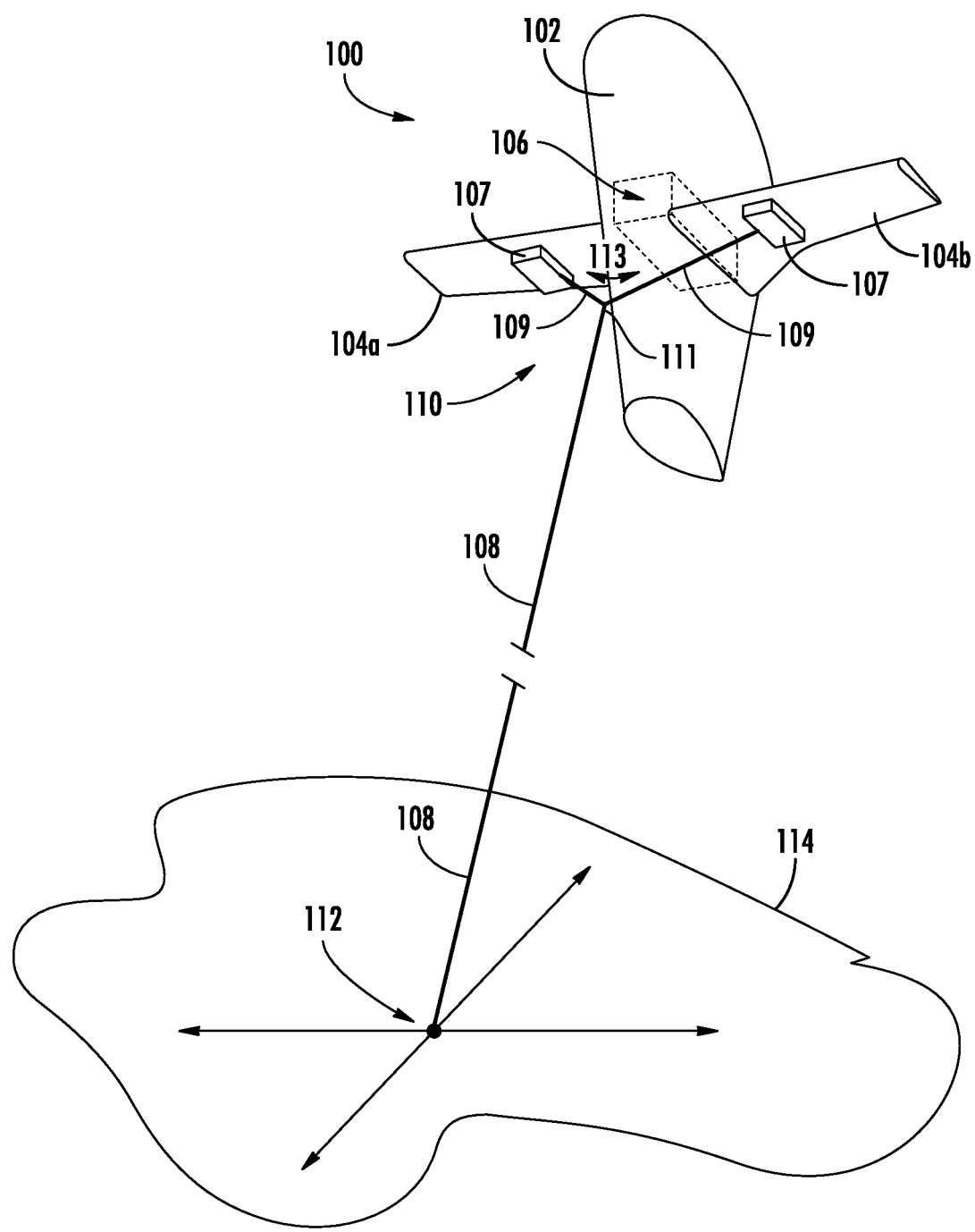
FIG. 1 is a conceptual drawing that is useful for understanding an arrangement of a tethered unmanned aerial vehicle (TUAV).
Figure 2:
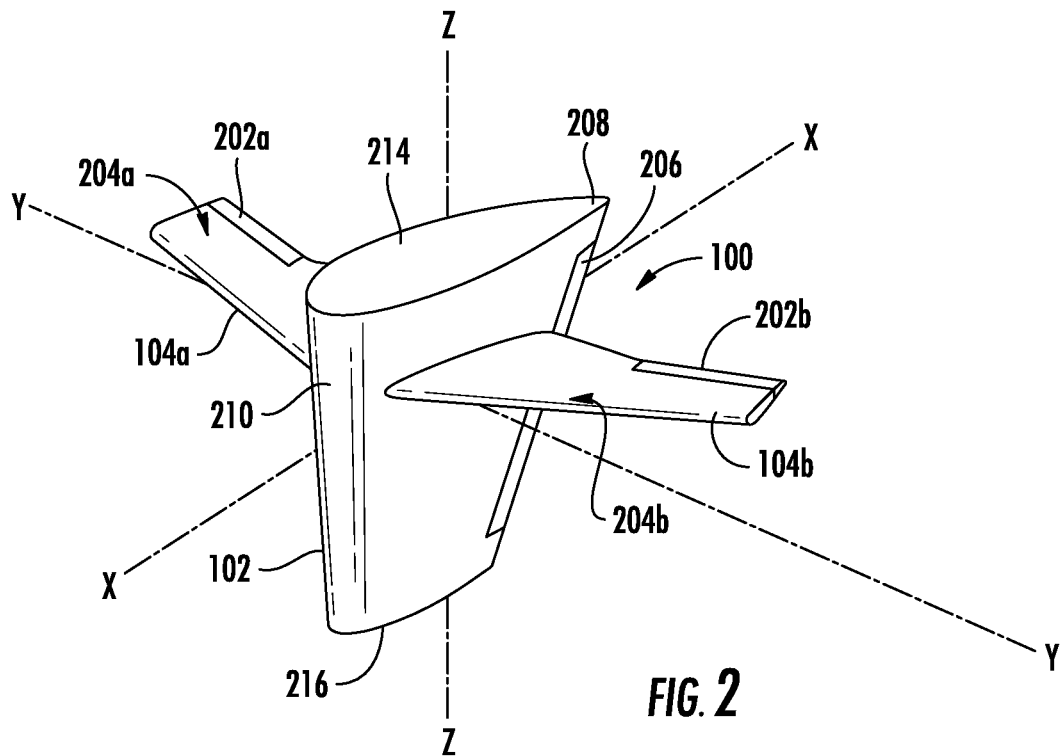
FIG. 2 is drawing that is useful for understanding an arrangement of certain control surface features of a TUAV.
Figure 3:
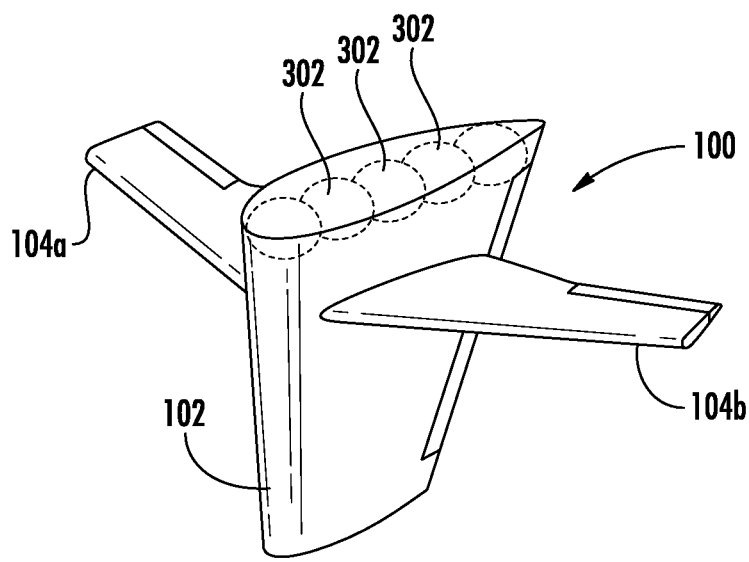
FIG. 3 is a drawing that is useful for understanding an arrangement of one or more buoyancy cells provided in a TUAV.

An embodiment TUAV as disclosed herein is shown in FIGS. 1-3. As shown in FIG. 1, the TUAV 100 is comprised of a fuselage 102 defining a central body of the TUAV, and at least one wing fixed to the fuselage. In the embodiment shown in FIG. 1, a first wing 104*a*, and a second wing 104*b* are provided extending bilaterally from the central body of the TUAV. In some embodiments, the first and second wings can be designed as two portions of a single wing that extends through the body of the TUAV. A tether attachment structure (TAS) 110 can be comprised of a harness 109 which is secured to portions of the fuselage 102 and/or the wings 104*a*, 104*b* to facilitate attachment of the TUAV to a tether 108. The tether 108 is attached at a remote end to a ground element 112 which is provided for securing the TUAV to the ground when aloft over an area of interest 114.

The ground element 112 is configured so that it is capable of providing sufficient resistance to forces exerted through the tether so as to facilitate positional control over the geographic location where the tether is attached to the ground. In its simplest form, the ground element can be an anchor which has sufficient mass and/or includes ground engagement structure so that the anchor will remain fixed to a desired ground position. Anchors of this kind are well known and will not be described here in detail. In other embodiments, the ground element 112 can be a mobile ground element comprised of a ground mobile vehicle or water mobile vehicle. The various types of ground elements which can be used will be described below in further detail.

The tether can be comprised of a thin flexible elongated wire or filament. The tether can be comprised of one or more strands of a suitable material so that it is capable of withstanding anticipated loads placed upon the tether by the TUAV. If wired control of the TUAV is to be utilized, the tether can include signaling lines for communicating digital data signals to and from the TUAV. For example, the signaling lines can be comprised of one or more conductive wires and/or optical fibers.

A payload 106 of the TUAV can include a control system and at least one wired or wireless communication device for receiving flight commands from a remote control station (e.g., a ground based station controlled by a human operating). One or more sensors 107 can be provided to facilitate control of the TUAV.

A fuselage 102 of the TUAV can be formed to have an aerodynamic fin shape to control yaw and provide stability about the z axis as shown in FIG. 2. As such, the fuselage may have a tapered profile which extends from a broader region 210 at the front of the fuselage and tapers to a narrower region at the rear or trailing edge 208 of the fuselage. The fuselage is arranged to accommodate an internal payload 106 within one or more bays provided for this purpose. Accordingly, the fuselage 102 can be comprised of a lightweight structure having an outer skin to define an aerodynamic shell. The exact type of structure used to form the fuselage is not critical and will depend on various design considerations. However, it will be appreciated that an embodiment fuselage can have a truss structure, a geodesic structure, or may be formed as a monocoque shell. Suitable internal structures used to form the fuselage can be comprised of metals (such as aluminum alloy), wood and/or composite materials. The outer skin of the fuselage can be formed of a suitable material such as lightweight alloy, fabric, composite materials or a combination thereof. For example, embodiment skins can be comprised of a thin film plastic sheets which are comprised of polyethylene terephthalate (PET), polyimide and/or polyester material.

Each of the wings 104*a*, 104*b* is comprised respectively of a rigid or nearly rigid airfoil shaped body which is capable of producing lift in response to a flow of air across a major airfoil surface (e.g. airfoil surface 204*a*) defined by the wing. As such, the wings 104*a*, 104*b* can have a rounded leading edge connected to upper and lower wing surfaces that taper toward a sharp trailing edge, where the upper and lower surfaces have a defined curvature selected for producing lift. As used herein, the phrase rigid or nearly rigid means that the wing is stiff enough to maintain the airfoil profile in varying conditions of airflow. This is in contrast to a flexible wing in which the surface is typically a thin flexible membrane which requires wind pressure to maintain the airfoil shape. Still, it should be appreciated that an inflated or pressurized wing could be used in some scenarios if adequately supported along a section of the leading edge of the wing. A rigid wing as described herein may have external bracing and/or a fabric covering.

The wings 104a, 104b can be secured at various positions relative to the fuselage 102. An embodiment TUAV shown in FIGS. 1-3 can have a mid-wing design with the wing mounted approximately halfway between the top 214 and bottom 216 of the fuselage 102. Of course, other wing positions are also possible; for example, the TUAV can have a "high wing" design wherein the wing is mounted between the top and mid-point of the fuselage. Various wing structures used in aircraft are well known in the art and therefore will not be described here in detail. However, it will be appreciated that wings 104a, 104b can be comprised of a cantilever or braced design (e.g. a strut braced or wire braced wing) and will include internal structure comprising at least one spar, a plurality of ribs, and stringers. Suitable internal structures used to form the wing can be comprised of metals (such as aluminum alloy), wood and/or composite materials. An outer skin can be formed of a suitable material such as lightweight alloy, fabric, composite materials or a combination thereof.

The design details of the wings 104a, 104b will depend in part on the particular application. However, it will be appreciate that an embodiment wing can advantageously have a relatively low aspect ratio (short and stubby wing) to facilitate structural efficiency, a moderate aspect ratio, or a high aspect ratio (long and slender wing) which is aerodynamically efficient and induces less drag. The wings 104a, 104b can extend straight away from the fuselage or can be slightly swept back towards the rear of the TUVA from the root to the tip. The wings can advantageously have a dihedral design such that the tips of the wing are slightly higher than the root so as to add roll stability. However, the invention is not limited in this regard and an anhedral arrangement is also possible in some scenarios. The exact design of the wing can depend on various factors such as the amount of lift and stability required, anticipated wind conditions that will be experienced by the TUAV, weight constraints, cost, and so on.

The TUAV also includes at least one movable flight control surface which is capable of selectively varying an attitude of the TUAV in flight in response to a control signal. In an embodiment shown in FIG. 2, the at least one movable flight control surface is comprised of ailerons 202a, 202b disposed along the trailing edge of each wing. But the invention is not limited in this regard and additional or alternative movable flight control surfaces can also be provided. For example, such flight control surfaces can in some scenarios include a rudder 206 disposed toward a rear of the fuselage at a suitable location (e.g., along a fuselage trailing edge 208) or on an optional boom (not shown) extending from the trailing edge. Although the TUAV is tethered to the ground, a rudder can help provide directional stability for purposes of maintaining a particular vehicle orientation or attitude. In some scenarios, it may also be advantageous to include one or more elevator control surfaces (not shown) which may be disposed at the trailing edge of the fuselage or on the boom. The number and type of flight control surfaces can depend in part on anticipated wind conditions, maneuverability requirements, weight constraints, and cost. The addition of such control surfaces can help control an attitude of the TUAV by controlling pitch, roll and yaw.

The wings 104a, 104b can also include one or more high-lift devices (not shown) which well known for purposes of maintaining lift at low wind speeds. For example, a leading edge slat (fixed or retractable) and slot arrangement can be used for this purpose. A cuff disposed on a leading edge of the wing can also be used on the leading edge of the wing to modify the airfoil section and thereby improve low wind-speed operating characteristics of the TUAV. Other exemplary high lift devices can include a flap on the trailing edge of the wing which can be rotated so that the trailing edge extends downwards so as to generate extra lift. The decision to include such high-lift devices and their exact arrangement can depend on various factors such as the amount of lift required and the anticipated wind conditions that will be experienced by the TUAV. Of course, the benefit of such high lift devices in any design must be balanced against the added weight, cost and complexity they impart to the TUAV.

Referring now to FIG. 3 it can be observed that the TUAV includes at least one buoyancy cell 302. A TUAV 100 having a plurality of buoyancy cells 302 is illustrated in FIG. 3. The buoyancy cells are advantageously disposed within the fuselage and configured for containing a lifting gas. For greater stability, the buoyancy cells can be disposed near a top of the fuselage. Further, the buoyancy cells are arranged within the fuselage to take account of the vehicle's center of gravity, whereby the TUAV is maintained in a neutral attitude with the wings level relative to the ground, and the aircraft neither pitched upwardly or downwardly. In some scenarios it may be advantageous to provide additional buoyancy cells disposed in the wings 104a, 104b. In an alternative embodiment, the outer shell material comprising the fuselage 102 (or portions thereof) could define a single large buoyancy cell. A lifting gas as referred to herein is a gas that has a density lower than that of air. An exemplary gas that can be used for this purpose can include helium or hydrogen. The one or more buoyancy cells 302 will have a combined capability to contain a predetermined volume of lifting gas that is sufficient to provide positive buoyancy for the TUAV when the TUAV is disposed in air and contains a predetermined payload. The exact volume of lifting gas required for this purpose will depend on a particular TUAV design which takes account of the vehicle's size, weight and payload requirements.

The TUAV also includes a tether attachment structure 110 for securing a tether 108 to the TUAV. The tether attachment structure can include a harness 109 comprised of a flexible cable or rigid member that is used to secure the tether 108 to portions of the TUAV. For example, an embodiment TUAV shown in FIG. 1 includes a harness 109 which extends between structural attachment hard points located within each of the wings 104a, 104b, and is connected in the center to the tether 108. The structural attachment points are advantageously secured to an internal structural element of the wings (e.g. the spar) which is securely attached to the fuselage 102. In some scenarios, the harness 109 can be arranged in the form of an arc which extends in front of the TUAV as shown.

The tether attachment to the harness is advantageously arranged so that the tether can move from side to side of the TUAV along the length of the harness 109 as indicated by arrows 113. For example, the tether can be attached to the harness by means of a loop or pulley 111 that rides along the length of the harness in directions indicated by arrows 113. This movement of the tether along the harness can facilitate tacking and mobility of the TUAV. More particularly, the movement of the tether attachment point relative to the harness allows the TUAV to operate in a manner similar to sailboat, allowing the TUAV to move in any direction by tacking from one side of the wind to the other. For example, the TUAV can "sail" at an angle to an oncoming wind (e.g. a 45° angle) and can alternate the direction of such angle relative to the wind so as to physically move in a direction into the wind. Of course, the invention is not limited in this regard and the tether 108 can in some embodiments be connected to the TUAV by other suitable means which facilitate such tacking operations.

Figure 12:
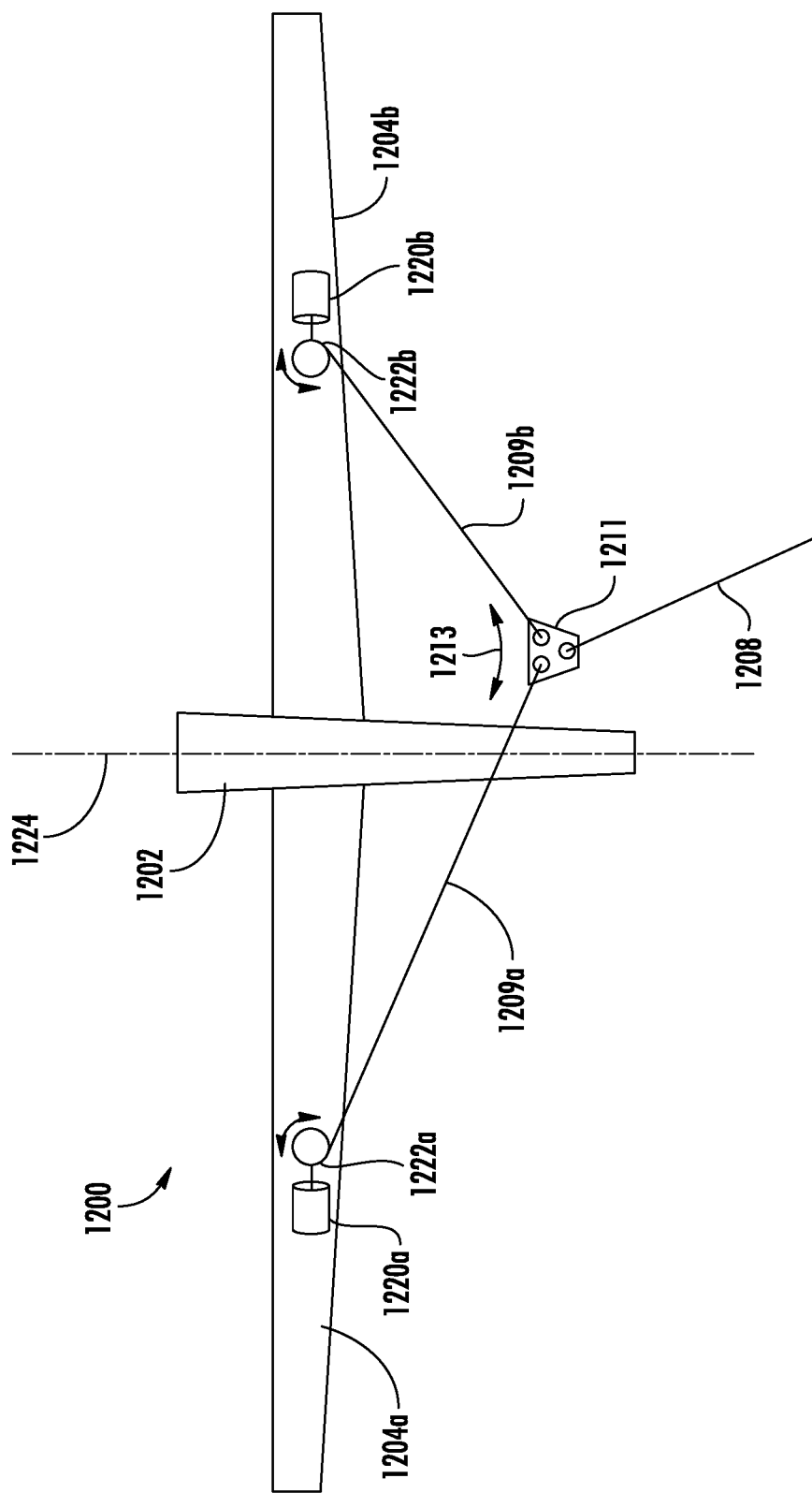
FIG. 12 is a drawing that is useful for understanding how an attachment location of a tether can be moved along a harness for the TUAV.

In an embodiment, the relative position of the tether attachment to the harness is motively regulated or controllably positioned along the harness. This feature enables controlling the position of the tether reaction load relative to the neutral axis of the TUAV 102. The controlled position along the length of the harness 109 can be facilitated by any suitable means. As an example, FIG. 12 shows an arrangement of a TUAV 1200 comprised of a fuselage 1202, wings 1204*a*, 1204*b*, and a harness comprised of cables 1209*a*, 1209*b*. A block 1211 is attached between first end portions of cables 1209*a* and 1209*b*. Cable 1209*a* is attached at a second end to a cable drum 1222*a* which can be rotatably driven by a motor (e.g. an electric motor) 1220*a*. Likewise, cable 1209*b* is attached at its second end to a cable drum 1222*b*, which is rotatable by motor 1220*b* (e.g., an electric motor). The motors 1220*a*, 1220*b* are under the control of a TUAV control system (not shown in FIG. 12). Operation of motors 1220*a*, 1220*b* allows the relative length of cables 1209*a*, 1209*b* to be independently varied by spooling the cable drums in appropriate directions. For example, the length of cable 1209*a* can be lengthened relative to the length of cable 1209*b* as shown in FIG. 12. When the relative lengths of cables 1209*a*, 1209*b* are varied, the relative position of the block along the length of the harness is effectively controlled or varied in directions indicated by arrow 1213. A tether cable 1208 is also attached to the block. Accordingly, the position of the tether reaction load (e.g. a ground anchor) can be varied in directions 1212 relative to the neutral axis 1224 of the TUAV. This relative movement of the tether 1208 along the length of the harness formed by cables 1209*a*, 1209*b* can facilitate tacking and mobility of the TUAV.

Figure 4:
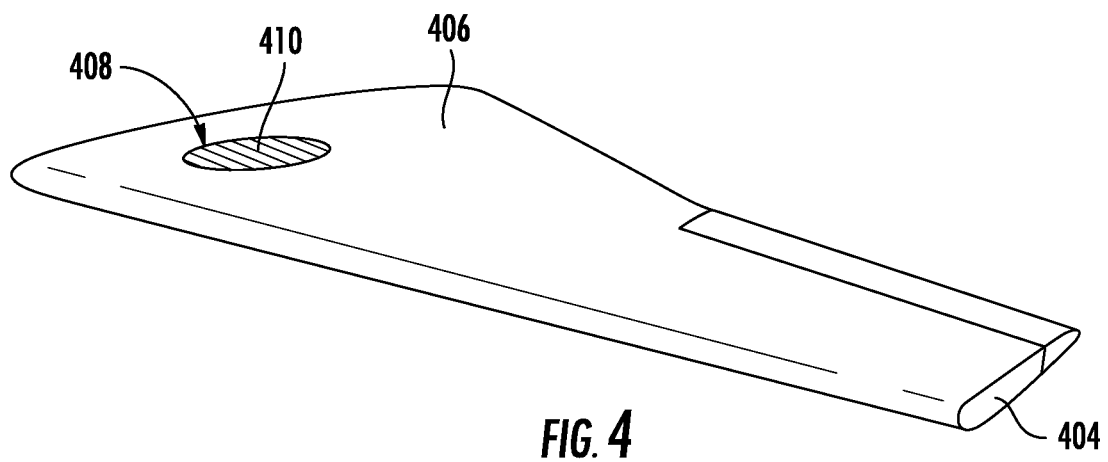
FIG. 4 is a drawing that is useful for understanding an arrangement of an exhaust or diffuser section of a wind powered generator in a TUAV.
Figure 5:
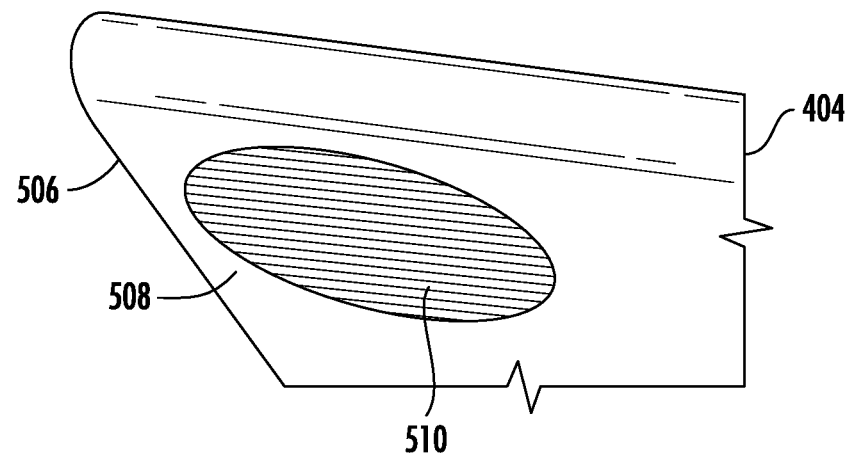
FIG. 5 is a drawing that is useful for understanding an arrangement of an inlet nozzle section of a wind powered generator in a TUAV.

The TUAV also includes at least one wind-powered generator. The wind powered generator could be a conventional arrangement comprised of an outboard propeller disposed in the wind which drives an internal generator. However, such an arrangement can be relatively inefficient and have a negative impact on flight performance. Accordingly, it is advantageous to instead provide a wind powered generator which is configured to generate electric power in response to the flow of air across one or both wings 104*a*, 104*b* when the TUAV is aloft. Referring now to FIGS. 4 and 5, it can be observed that a TUAV can have upper and lower apertures 408, 508 disposed in opposing upper and lower surfaces 406, 506 of a wing 404. Suitable louvered members 410, 510 can be provided to protect the internal portions of the wing and the wind powered generator. The louvered members can also be arranged to guide air into the apertures and prevent the intrusion of debris at low altitudes. The louvers 410, 510 can be a fixed arrangement so that they are always open, or can be controlled by an actuator (not shown) so as to open and close the apertures 408, 508 in accordance with the need for power generation and to optimize flight dynamics as conditions require.

Figure 6:
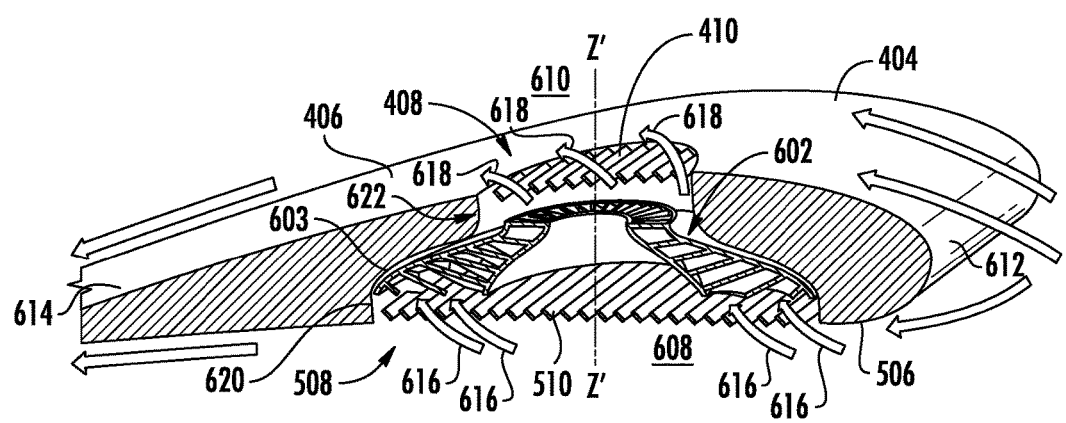
FIG. 6 is a cross-sectional view of a wing of a TUAV that is useful for understanding a wind powered generator.

Referring now to FIG. 6 it can be observed that a turbine provided within the wing 404 can include a turbine rotor 602 which is disposed for rotation within a turbine housing 603. In an embodiment the turbine rotor 602 can be configured for rotation about an axis z' which is aligned in a direction generally transverse to the major upper and lower wing surfaces 406, 506. The turbine housing 603 is arranged so that the lower aperture 408 defines a nozzle for providing air to the turbine rotor. The turbine rotor can comprise a plurality of blades and in the most basic embodiment can simply comprise a propeller. The turbine housing also comprises a diffuser section 622 to facilitate the exhaust of air from the turbine to the upper aperture 408. When air is flowing from a leading surface 612 of the wing toward a trailing surface 614 (e.g., an air flow caused by wind) the airfoil shape of the wing will cause the formation of a high pressure zone in region 608 and a low pressure zone in region 610. In other words, the air pressure above the wing will be lower than the air pressure below the wing as a result of the operation of the airfoil shape. This difference in air pressure will cause a flow of air from region 608 to region 610 as indicated by arrows 616, 618.

Figure 7:
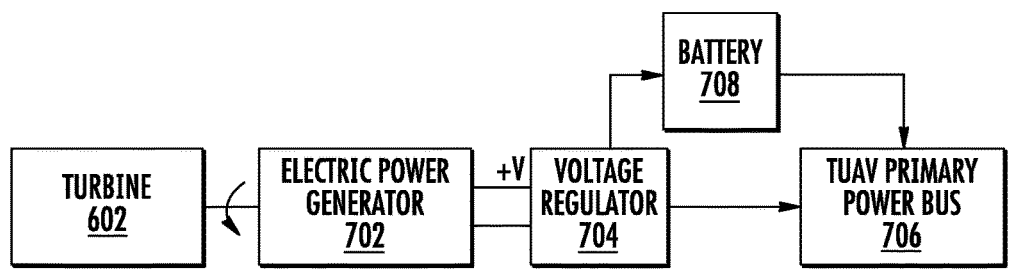
FIG. 7 is a block diagram that is useful for understanding how electric power is generated and used in a TUAV.

The flow of air through the turbine rotor will cause the turbine rotor to rotate. This rotation of the turbine rotor is used to drive an electric generator 702 as shown in FIG. 7. The voltage output from the generator can coupled to a voltage regulator 704 which regulates electric power applied to a TUAV primary power bus 706. In some scenarios it can be anticipated that the presence of wind sufficient to drive the turbine rotor 602 may be intermittent. In such instances, at least a portion of the electric power from the voltage regulator 704 can be used to maintain a charge on a battery 708 when sufficient power is being generated. Thereafter, the battery 708 can be used to supply electricity to the primary power bus 706 when insufficient power is being generated by the electric power generator 702.

An arrangement as described herein with the turbine rotor disposed inside the wing has several advantages over conventional propeller driven designs. The turbine is a protected assembly because it is disposed within the wing and is more compact as compared to propeller driven generators (which are attached outside the wing with blades extending in directions which are perpendicular to the upper and lower airfoil surfaces). These features facilitate transport of the TUAV with greater ease and time savings in deployment. The architecture disclosed herein also enables the potential to substantially increase the power generation performance over conventional propeller driven designs because the turbo generator operates based on the inherent pressure differential between the upper and lower surfaces of the airfoil. The arrangement disclosed provides more consistent generation/operational performance over a large wind speed range, which is very difficult to achieve with simple propeller driven generator approaches. Further, utilization of the pressure differential created by the airfoil combined with the direct flow vectoring provided by the louvers 410, 510 will provide significantly greater power generation capability over a conventional propeller design. Finally, a turbine rotor 602 for a turbine as described herein can be an extremely low cost part because the individual blade loads and size requirements are far less than those associated with a propeller generator configuration mounted external to the wing.

Figure 8:
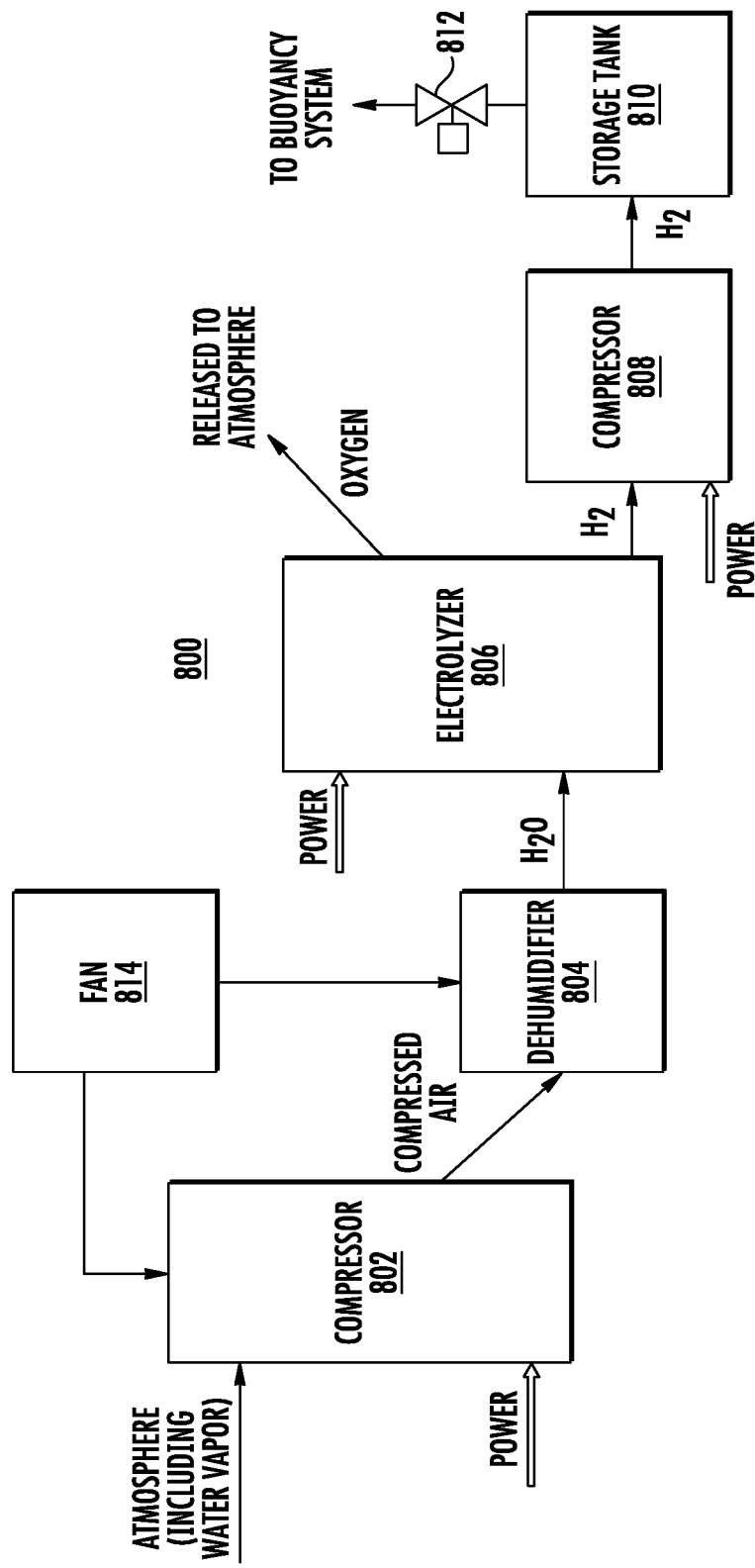
FIG. 8 is a block diagram that is useful for understanding a lifting gas replenishment system (LGRS) which can be used in a TUAV.

It is anticipated that a wind-power turbine as described herein can provide power to the TUAV for an extended duration of time, thereby providing the possibility of very long duration flights. But a potentially limiting factor of such long duration flight time is the loss of lifting gas from buoyancy cells 302. All lighter-than-air vehicles suffer from this loss of lifting gas based on the very small molecule size of hydrogen and helium that is commonly used in such systems. Accordingly, the TUAV can advantageously include a lifting gas replenishment system (LGRS) disposed in the TUAV and configured to extract the lighter than air gas from water vapor that is present in air. An exemplary LGRS 800 which can be used for this purpose is shown in FIG. 8.

As illustrated therein, the LGRS 800 is comprised of a first compressor 802, a dehumidifier 804, electrolyzer 806 and second compressor 808. The LGRS can also include a gas storage tank 810, a control valve 812, and a compressed air cooling fan 814.

In operation, the first compressor 802 receives a flow of air from the atmosphere surrounding the TUAV and compresses same using power supplied by the TUAV (e.g., electric power generated using a wind power turbine). The compressed air is then communicated to a dehumidifier 804 which extracts water vapor from the compressed flow of air. A flow of air from the fan 814 can be used to cool the compressed gas in the dehumidifier and thereby facilitate condensation of water to liquid form. In some embodiments a flow of air from the fan 814 can also be used to cool the compressor 802. The water which has been extracted from the air in the dehumidifier is then communicated to the electrolyzer 806 where electrolysis is used to separate hydrogen and oxygen molecules that comprise the water ($H_2O$). The oxygen from this process can be released to the atmosphere and/or used in a combustion process for other purposes. The hydrogen obtained as a result of this process is communicated to a compressor 808 which compresses the hydrogen for storage in a highly compressed form in storage tank 810. A control valve 812 controls a release or flow of the stored hydrogen for use in the buoyancy cells. For example, the control valve can be under the control of a buoyancy management system. Of course, an LGRS as described herein is not necessary if the TUAV is to be operated for shorter durations flights, and in such cases the various components of an LGRS can be omitted.

Figure 9:
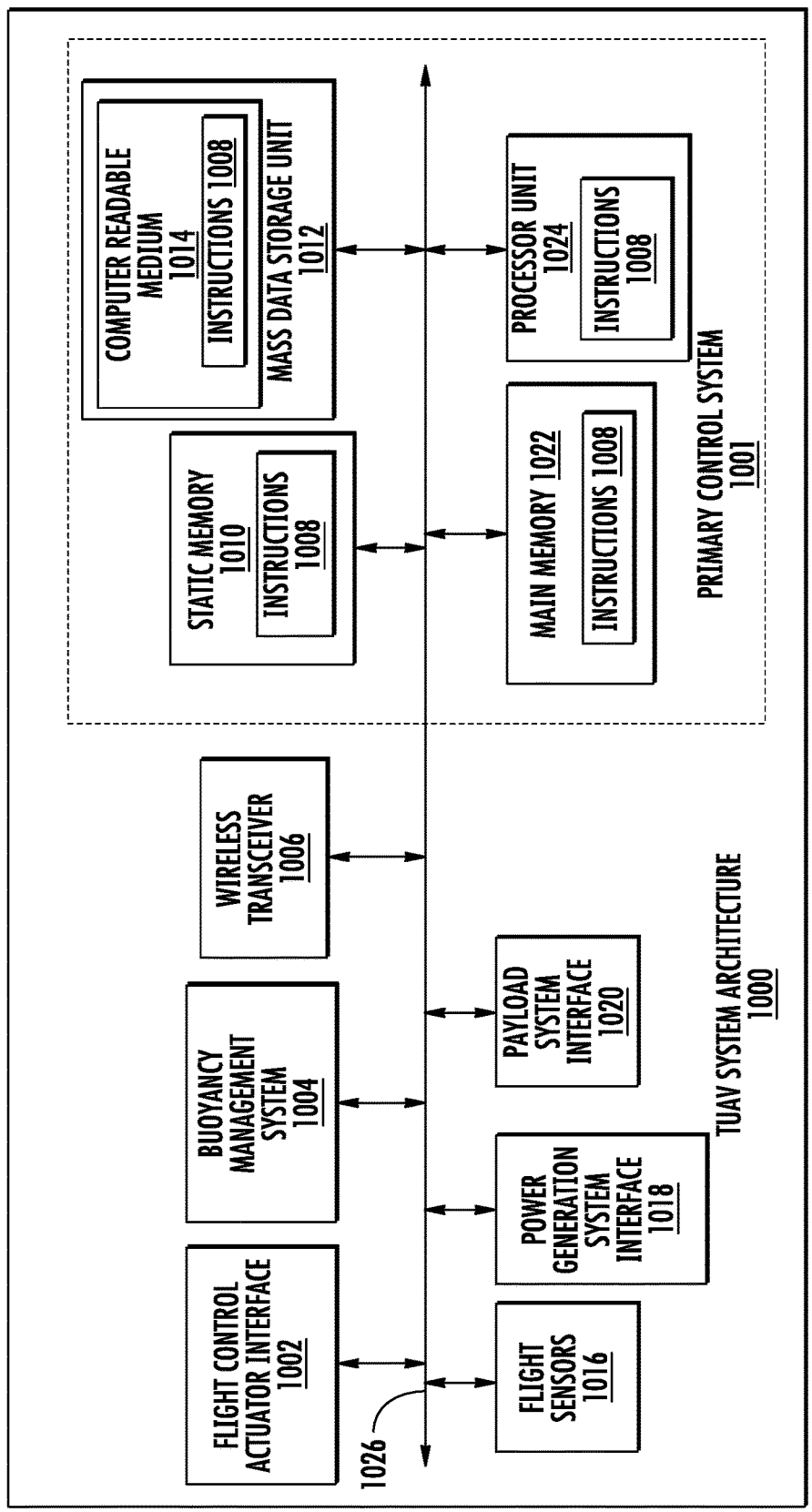
FIG. 9 is a block diagram that is useful for understanding a TUAV system architecture, including a TUAV control system.

Referring now to FIG. 9 there is shown a block diagram of an exemplary system architecture for a TUAV as disclosed herein. The TUAV system architecture 1000 can include a primary control system (PCS) 1000 for controlling overall operation of the TUAV. The PCS includes a processor unit 1024, a mass data storage unit 1012 which can be a disk drive or a solid state memory, a main memory 1022 and a static memory 1010, which communicate with each other via a data bus 1026. The processor unit can be one or more devices such as a central processing unit (CPU), an application specific circuit (ASIC), a programmable logic device, or other circuit programmed to perform the functions described herein.

The mass data storage unit 1012 can comprise a computer readable medium 1014 on which one or more sets of instructions 1008 (e.g., software code) can be stored. These instructions can be provided to facilitate implementation of one or more of the methodologies, procedures, or functions of a TUAV as described herein. The instructions 1008 can also reside, completely or at least partially, within the main memory 1022, the static memory 1010, and/or within the control unit 1024 during execution thereof.

The TUAV system architecture can also include a flight control actuator interface 1002, a buoyancy management system (BMS) 1004, a wireless transceiver 1006, flight sensors 1016, a power generation system interface 1018 and payload system interface 1020. The PCS 1001 can communicate with these elements of the TUAV using data bus 1026.

The flight control actuator interface 1002 can include hardware and/or software components which facilitate communications between PCS 1001 and one or more flight control actuators. For example, the interface can be used to communicate command signals from PCS 1001 to flight control actuators so as to cause movement of one or more flight control surfaces as described herein. The flight control actuator interface can also facilitate communication of actuator or control surface position information from the flight control actuators to the PCS 1001.

The BMS 1004 can be used to help facilitate control over the buoyancy of the TUAV. For example, this system can control the flow of lifting gas to and from the buoyancy cells and onboard storage tanks. As such, the BMS 1004 can control one or more valves which control a flow of lifting gas between the buoyancy cells and onboard gas storage tanks (not shown). The BMS 1004 can also control the storage and generation of lifting gas by an LGRS as described herein. The BMS 1004 can operate under the control of PCS 1001 to maintain a buoyancy requirement at each phase of a TUAV mission. For example, while in flight the BMS can maintain an optimal buoyancy to help maintain the TUAV in a desired altitude and position while minimizing strain on a tether. During recovery operations, the BMS can similarly adjust the buoyancy of the TUAV to facilitate descent of the TUAV while minimizing stress and strain on a tether. The BMS can also monitor available lifting gas stored onboard the TUAV to determine when LGRS operation is needed to generate more lifting gas.

Flight sensors 1016 are used to monitor one or more aspects of the TUAV to facilitate flight operations while aloft. Exemplary sensors can include altimeters, wind speed sensors, vertical speed sensors, attitude sensors (e.g., to measure pitch, roll and yaw), heading sensors, and so on. Further, to facilitate unmanned flight operations, one or more imaging sensor can be provided among the flight sensors to facilitate flight operations. The outputs from these sensors can be communicated to the PCS 1001 where they can be used to facilitate autonomous flight operations under the control of the PCS 1001. In addition, these sensor outputs can be commutated into a data stream and communicated to a remote ground station using a data link provided by wireless transceiver 1006. Wireless transceiver 1006 facilitates receiving flight control commands for the TUAV from a remote station. Received flight control command signals are communicated to the processor unit 1024 where such commands are carried out using flight control actuators 1002, buoyancy management system 1004 and flight sensors 1016.

Power generation system interface 1018 facilitates monitoring and control of the power generation system (e.g., a power generation system as disclosed herein with respect to FIGS. 6 and 7). For example, the power generation system interface 1018 can facilitate control of the turbine, louvers 410, 510, and battery charging operations by the processor unit 1024. In some scenarios, the processor unit can evaluate flight dynamic information to determine when the turbine should be operated for purposes of power generation. The power generation system interface can also facilitate monitoring of the power generation system to determine whether the power generation system is functioning properly, evaluate battery charging requirements, and monitor power bus voltage levels.

A payload system interface 1020 can be provided to facilitate monitoring of operations associated with a TUAV payload. A wide variety of different payload systems are possible and the invention is not intended to be limited in this regard. However, it should be appreciated that exemplary payloads can include RADAR equipment, communications transponders, optical imagery sensors, infrared sensory equipment, satellite communication equipment, cellular radio transceivers, and so on. In fact, any type of equipment associated with C4ISR operations can be included in the payload to facilitate a particular mission requirement.

Figure 10:
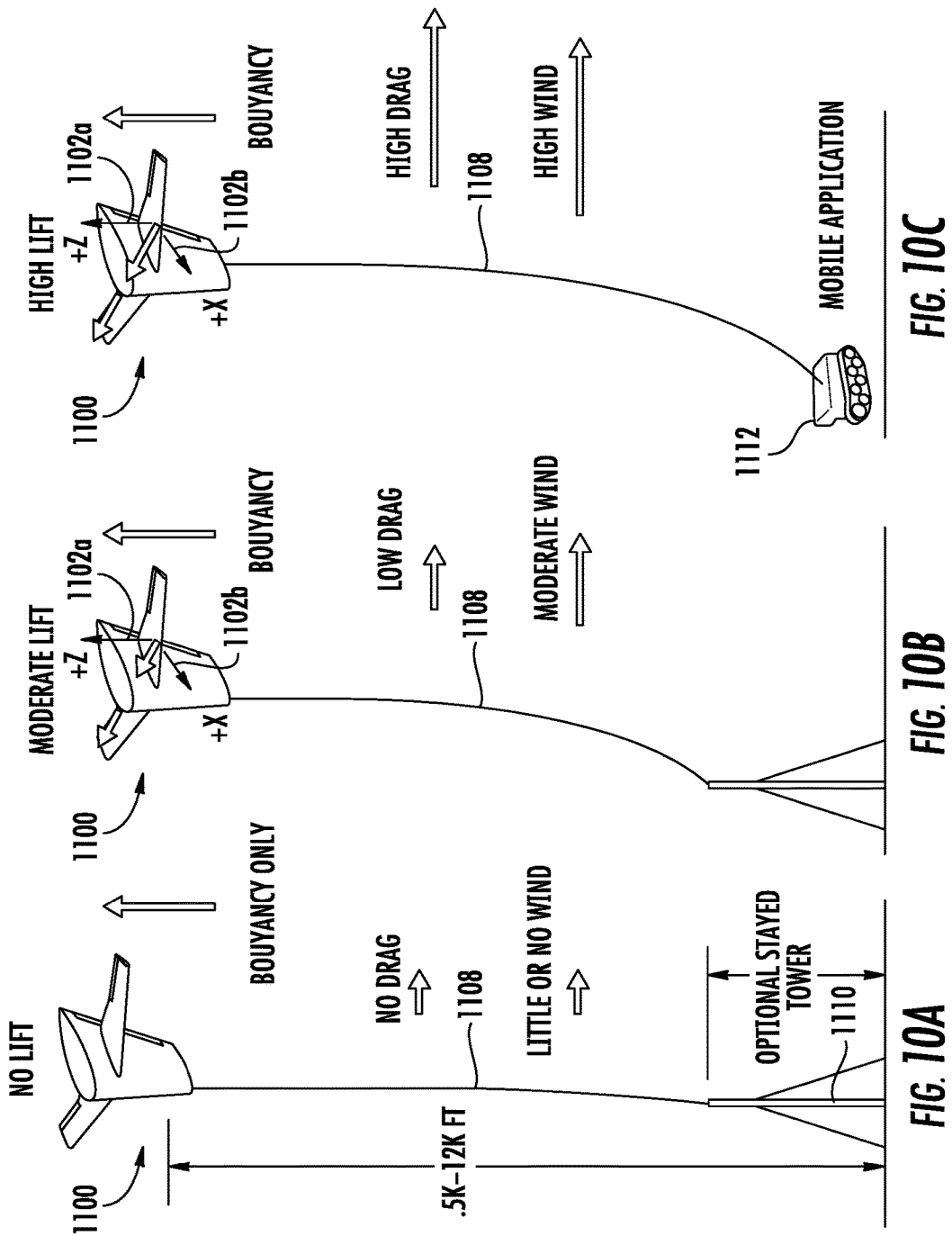
FIGS. 10A, 10B and 10C (collectively FIG. 10) are a series of drawings which show how the lift provided by the wings of a TUAV work in conjunction with a buoyancy system to facilitate tethered operations under various conditions.

FIGS. 10A, 10B and 10C (collectively FIG. 10) are a series of drawings which show how the lift force provided by the wings in a TUAV 1100 can work in conjunction with the buoyancy system to facilitate tethered operations under various conditions. As shown in FIG. 10B the lift force provided by the rigid or near rigid wing includes vector force components which are directed in the +z and +x directions. Accordingly, there is a first vector force component 1102a that urges the TUAV 1110 upward (in the +z direction) and a second vector force component 1102b that urges the TUAV forward (in the +x direction). A detailed discussion of wing physics is beyond the scope of the invention. However, it will be appreciated that a lifting force provided by an airfoil wing will act against a reaction force provided by the tether to result in a net force in a forward vector direction which is into the direction of the oncoming wind. This forward force vector is similar to the forward force vector achieved by a sailboat, whereby the tether of TUAV functions in a manner which is similar to that of a sailboat keel, and helps drive the TUAV forward.

In the presence of higher wind velocity, the wings provide greater magnitude lifting force such that the first and second vector force components increase in magnitude. Accordingly, the second vector force component 1102a can be used advantageously in the embodiments described herein to help cancel a drag load when working cooperatively with the tether 1108. When the wind conditions are moderate as shown in FIG. 10B, the second vector force component 1102b provides a moderate amount of force in the forward (+x) direction to reduce the drag exerted on the tether 1108. As wind velocity increases, the magnitude of second vector force component 1102b also increases so as to further counteract the drag exerted on the tether. The wings of the TUAV are advantageously designed such that the drag, buoyancy and lifting forces balance to reduce tether loading and maintain a more consistent operating attitude across a broad range of wind conditions. This gives the TUAV 1100 a broader operational capability as compared to conventional tethered aerostats while still maintaining, longer duration unattended flight times exceeding that which is possible with conventional UAVs.

FIG. 10A-10C also illustrate certain alternative arrangements for securing the tether 1008 to a ground reaction element. In FIG. 10A it can be observed that the tether can optionally be secured to an upper portion of rigid or stayed tower 1110. In other embodiments, it can be advantageous to secure an end of the tether to an autonomous unmanned ground vehicle (UGV) 1112, thereby facilitating autonomous mobile operations of the TUAV. In other words, the location where the tether is fixed to the ground can be changed by operating the propulsion system of the UGV to changes its geographic location on the surface. Power for the UGV can be provided to the UGV from the TUAV by means of conductive wires included in the tether. Alternatively, the tether can be used to apply a motive force to the UGV. The UGV can have an onboard generator driven by rotation of wheels which roll on the ground. The UGV could then generate its own power by means of the onboard generator as the UGV is pulled along by the TUAV. In scenarios where a UGV is used as the means to secure the tether to the ground, the wings and buoyancy system in the TUAV can be used to help ensure that the lifting forces applied to the UGV through the tether 1108 do not exceed the ground holding ability of the UGV. However, there may be some scenarios where it is desirable to control the TUAV so its lift actually exceeds such ground holding ability so that the UGV can be carried over areas where it cannot otherwise travel. For example, small bodies of water could be traversed by allowing the lift of the TUAV to actually carry the UGV aloft for some distance.

Figure 11:
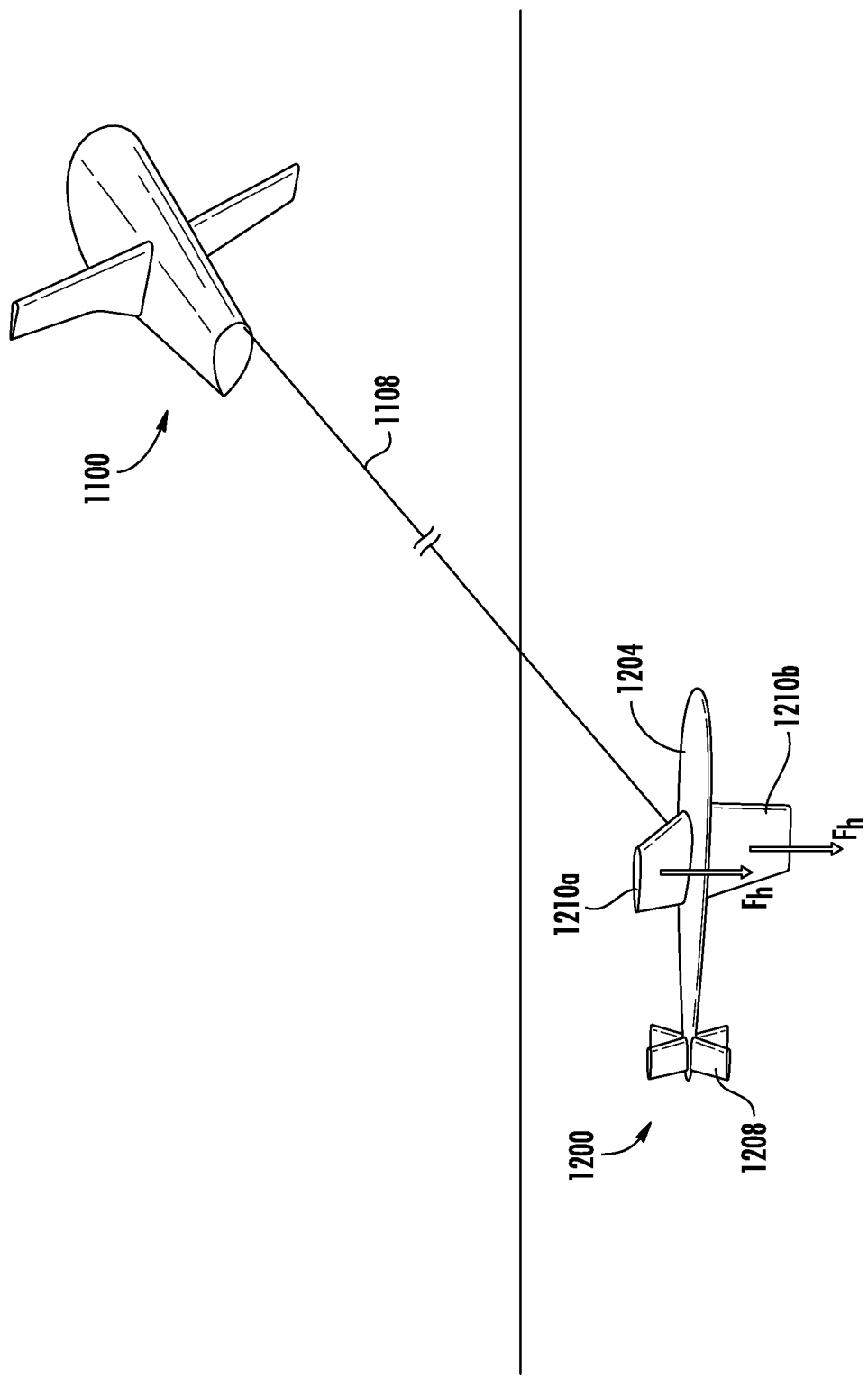
FIG. 11 is a drawing which is useful for understanding how the TUAV can be used in conjunction with a unmanned underwater vehicle.

According to a further aspect, the UGV in FIG. 10C could be replaced by an autonomous water vehicle such as an unmanned underwater vehicle (UUV) shown in FIG. 11. More particularly, a TUAV 1100 could be attached by means of a tether 1108 to UUV 1200. The UUV 1200 can comprise a sub-surface body containing an underwater payload. The sub-surface body can have inverted hydrofoil planes 1210a, 1210b which are controlled for exerting a downward force (Fh) to counter the forces applied by the TUAV through the tether 1108. The inverted hydrofoil planes also provide lateral resistance to counter a lateral force component of aerodynamic lift generated by the TUAV 1100. The UUV can be advantageously equipped with a propulsion assembly (e.g., a motor, power source and propeller) to provide mobility for the UUV so that the geographic location of the tether point can be moved as necessary.

Power for the UUV can be provided in a manner similar to the UGV as described above. For example, conductive wires included in the tether can carry electric power from the TUAV to the UUV. Alternatively, the tether can be used to apply a motive force to the UUV. The UUV can have an onboard generator driven by rotation of an outboard propeller which is rotated as the UUV is moved through the water. The UUV could then generate its own power by means of the onboard generator as the UUV is pulled along by the TUAV.

In scenarios where a UUV is used as the means to secure the tether to the surface, the wings and buoyancy system in the TUAV can be used to help ensure that the lifting forces applied to the UUV through the tether 1108 do not exceed the holding ability of the UUV. Likewise the hydrofoil planes of the UUV can be controlled to facilitate such holding ability. However, there may be some scenarios where it is desirable to control the TUAV so that the lifting force it exerts through the tether actually exceeds such holding ability for short durations of time. Consequently, the UUV can be carried aloft for some distance and then returned to the water so that the UUV can be repositioned.

The autonomous water vehicle can also be one which is designed to operate on the surface of a body of water. The water vehicle in such scenarios can be any suitable floating vehicle arrangement such as a mono-hull boat or multi-hull boat (such as a catamaran). The water vehicle would function in much the same way as the UUV except that it would operate on the surface of the water instead of beneath the surface.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

We claim:
1. A tethered unmanned aerial vehicle (TUAV), comprising:
   a fuselage defining a central body of the TUAV;
   at least one wing fixed to the fuselage and comprising an airfoil shaped body capable of producing lift in response to a flow of air across a major wing surface;

at least one flight control surface configured to selectively vary an attitude of the TUAV in flight in response to a control signal;

at least one buoyancy cell disposed within the fuselage and configured for containing a lighter than air gas, the buoyancy cell having a predetermined volume sufficient to provide a positive buoyancy for the TUAV when the TUAV is disposed in air;

a harness secured to the fuselage, the harness including a tether attachment structure which facilitates attachment of the harness to a tether having an elongated flexible configuration, said tether capable of extending from the TUAV to the ground when the TUAV is aloft;

at least one wind-powered generator integrated with the TUAV and configured to generate electric power in response to the flow of air across said at least one wing when the TUAV is aloft, the at least one wind-powered generator comprising at least one turbine rotor disposed in the at least one wing so as to be rotatable about an axis which is aligned in a direction transverse to the major wing surface.

2. The TUAV according to claim 1, wherein the at least one flight control surface is selected from the group consisting of an aileron, an elevator and a rudder.

3. The TUAV according to claim 2, further comprising a control system responsive to at least one control signal and configured to control at least one of the flight control surfaces while the TUAV is in flight.

4. The TUAV according to claim 3, further comprising at least one signal receiving device for receiving at the TUAV the at least one control signal from a remote location.

5. The TUAV according to claim 3, wherein the control system is configured to selectively control at least one motor to dynamically control a position of the tether attachment structure relative to a neutral axis of the TUAV.

6. The TUAV according to claim 1, wherein the at least one wind-powered generator is disposed in the at least one wing, and is responsive to a pressure differential between opposing major surfaces forming the airfoil shaped body to drive the at least one turbine rotor.

7. The TUAV according to claim 6, wherein a first aperture is provided in a first one of the opposing major surfaces in an area where a high pressure zone is created when generating lift with the at least one wing, the first aperture defining a nozzle section through which high pressure air can flow to an input of the at least one turbine rotor.

8. The TUAV according to claim 7, wherein a second aperture is provided at a second one of the opposing major surfaces in an area where a low pressure zone is created when generating lift with the at least one wing, the second aperture comprising a diffuser through which air exhausted from the at least one turbine rotor can exit the at least one wing.

9. The TUAV according to claim 1, wherein the at least one wing is a rigid structure or near rigid structure.

10. The TUAV according to claim 1, further comprising a lifting gas replenishment system (LGRS) disposed in the TUAV and configured to extract the lighter than air gas from air.

11. The TUAV according to claim 10, wherein the LGRS is comprised of at least one compressor, a dehumidifier and an electrolyzer.

12. The TUAV according to claim 1, wherein the harness is comprised of at least one motor responsive to a TUAV control system and configured to dynamically facilitate a controlled movement of the tether attachment structure relative to a TUAV neutral axis.

13. A method for providing a tethered unmanned aerial vehicle (TUAV), comprising:

maintaining the tethered TUAV aloft using at least one buoyancy cell disposed within a fuselage of the TUAV to contain a predetermined volume of lighter-than-air gas sufficient to provide a positive buoyancy for the TUAV when the TUAV is disposed in air;

using at least one wing fixed to the fuselage to exert a lifting force on the TUAV while aloft in response to a flow of air across the at least one wing caused by the presence of wind;

maintaining the TUAV within a limited range of a geographic positions over a ground surface by securing the TUAV to the ground using a tether;

controlling a geographic position of the TUAV within the limited range of geographic positions while in the presence of wind by selectively varying a position of at least one flight control surface of the TUAV in response to a control signal;

generating electrical power onboard the TUAV in response to the flow of air across the at least one wing, where the electrical power is generated using at least one turbine rotor disposed in the at least one wing so as to be rotatable about an axis which is aligned in a direction transverse to the major wing surface.

14. The method according to claim 13, wherein the at least one flight control surface is selected from the group consisting of an aileron, an elevator and a rudder.

15. The method according to claim 14, further comprising using a control system onboard the TUAV which is responsive to at least one control signal to control at least one of the flight control surfaces while the TUAV is in flight.

16. The method according to claim 13, further comprising using the at least one flight surface to selectively vary a load placed upon the tether by the TUAV during varying wind conditions.

17. The method according to claim 13, further comprising dynamically varying during flight a position of an attachment point of the tether to the TUAV so that the attachment point position is selectively varied relative to a neutral axis of the TUAV.

18. The method according to claim 13, wherein the generating step further comprises operating at least one wind-powered generator disposed in the at least one wing responsive to a pressure differential between opposing major surfaces of the wing.

19. The method according to claim 18, wherein the wind powered generator is comprised of the at least one turbine rotor, further comprising selectively directing a flow of air to the at least one turbine rotor through a first aperture provided in a first one of the opposing major surfaces in an area where a high pressure zone is created when generating lift with the at least one wing.

20. The method according to claim 19, further comprising exhausting a flow of air from the at least one turbine rotor through a second aperture provided in a second one of the opposing major surfaces in an area where a low pressure zone is created when generating lift with the at least one wing.

21. The method according to claim 13, further comprising extracting the lighter-than-air gas from air by using a lifting gas replenishment system (LGRS) disposed in the TUAV.

22. The method according to claim 13, further comprising securing an end of the tether opposed from the TUAV to an unmanned vehicle and selectively varying a geographic position of the unmanned vehicle to vary an area of operations of the TUAV.

23. The method according to claim 22, wherein the unmanned vehicle is selected from the group consisting of an unmanned water surface operating vehicle and an unmanned underwater vehicle (UUV).

* * * * *